United States Patent
Caplow-Munro et al.

(10) Patent No.: US 11,550,362 B2
(45) Date of Patent: Jan. 10, 2023

(54) ROTATABLY COUPLED TOUCH SCREEN DISPLAYS

(71) Applicant: Microsoft Technology Licensing, LLC, Redmond, WA (US)

(72) Inventors: Devin Samuel Jacob Caplow-Munro, Seattle, WA (US); Mika Martti Ylitalo, Seattle, WA (US); Rajesh Surapureddy, Redmond, WA (US); Prasad Raghavendra, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/219,632

(22) Filed: Mar. 31, 2021

(65) Prior Publication Data
US 2022/0317729 A1 Oct. 6, 2022

(51) Int. Cl.
G06F 1/16 (2006.01)
G01B 7/30 (2006.01)
G06F 3/041 (2006.01)

(52) U.S. Cl.
CPC ............. *G06F 1/1641* (2013.01); *G01B 7/30* (2013.01); *G06F 1/1618* (2013.01); *G06F 3/041* (2013.01)

(58) Field of Classification Search
CPC ...... G06F 1/1641; G06F 1/1618; G06F 3/041; G01B 7/30
See application file for complete search history.

(56) References Cited

U.S. PATENT DOCUMENTS

| | | | |
|---|---|---|---|
| 7,791,869 B2 | 9/2010 | Takeya | |
| 8,705,229 B2* | 4/2014 | Ashcraft | G06F 1/1679 312/223.1 |
| 9,268,369 B2* | 2/2016 | Hirai | G06F 1/1669 |
| 9,507,384 B2* | 11/2016 | Liang | G06F 1/1656 |
| 9,715,959 B2* | 7/2017 | Deak | G01D 5/145 |
| 11,221,653 B2* | 1/2022 | Itoh | G06F 1/1618 |
| 11,239,710 B2* | 2/2022 | Gaule | H02J 7/0047 |

(Continued)

FOREIGN PATENT DOCUMENTS

| | | |
|---|---|---|
| CN | 101616196 B | 10/2014 |
| CN | 206891452 U | 1/2018 |
| CN | 111102916 A | 5/2020 |

OTHER PUBLICATIONS

"Application as filed in U.S. Appl. No. 16/905,805", filed Jun. 18, 2020, 51 Pages.

(Continued)

*Primary Examiner* — Rockshana D Chowdhury
(74) *Attorney, Agent, or Firm* — Alleman Hall Creasman & Tuttle LLP

(57) ABSTRACT

Examples are disclosed relating to computing devices and methods for determining angular orientations of a first planar substrate rotatably coupled to a second planar substrate. In one example, a method comprises: receiving at a three-axis magnetic sensor in the second substrate a magnetic field emanating from a magnet array in the first substrate; determining magnetic flux densities at first and second sensing axes of the sensor throughout a range of degrees; and using the magnetic flux densities to determine multiple angular orientations of the first substrate relative to the second planar substrate.

19 Claims, 7 Drawing Sheets

(56) References Cited

U.S. PATENT DOCUMENTS

| | | | |
|---|---|---|---|
| 2007/0138806 A1* | 6/2007 | Ligtenberg | G06F 1/1613 |
| | | | 292/251.5 |
| 2010/0117638 A1 | 5/2010 | Yamashita et al. | |
| 2010/0238620 A1* | 9/2010 | Fish | G06F 1/1654 |
| | | | 361/679.29 |
| 2013/0253864 A1 | 9/2013 | Fujita et al. | |
| 2014/0375311 A1 | 12/2014 | Ishii et al. | |
| 2015/0177337 A1 | 6/2015 | Yamashita et al. | |
| 2015/0316638 A1 | 11/2015 | Yamashita et al. | |
| 2016/0238670 A1 | 8/2016 | Shikama et al. | |
| 2017/0082461 A1 | 3/2017 | Difonzo et al. | |
| 2019/0383644 A1* | 12/2019 | Marauska | G01B 7/30 |
| 2020/0116801 A1 | 4/2020 | Watanabe et al. | |
| 2020/0132433 A1* | 4/2020 | Hsieh | G01B 7/30 |
| 2020/0400463 A1 | 12/2020 | Sogo et al. | |
| 2022/0013268 A1* | 1/2022 | Ge | H01F 7/0278 |

OTHER PUBLICATIONS

"International Search Report and Written Opinion Issued in PCT Application No. PCT/US22/020466", dated Jun. 8, 2022, 12 Pages.

\* cited by examiner

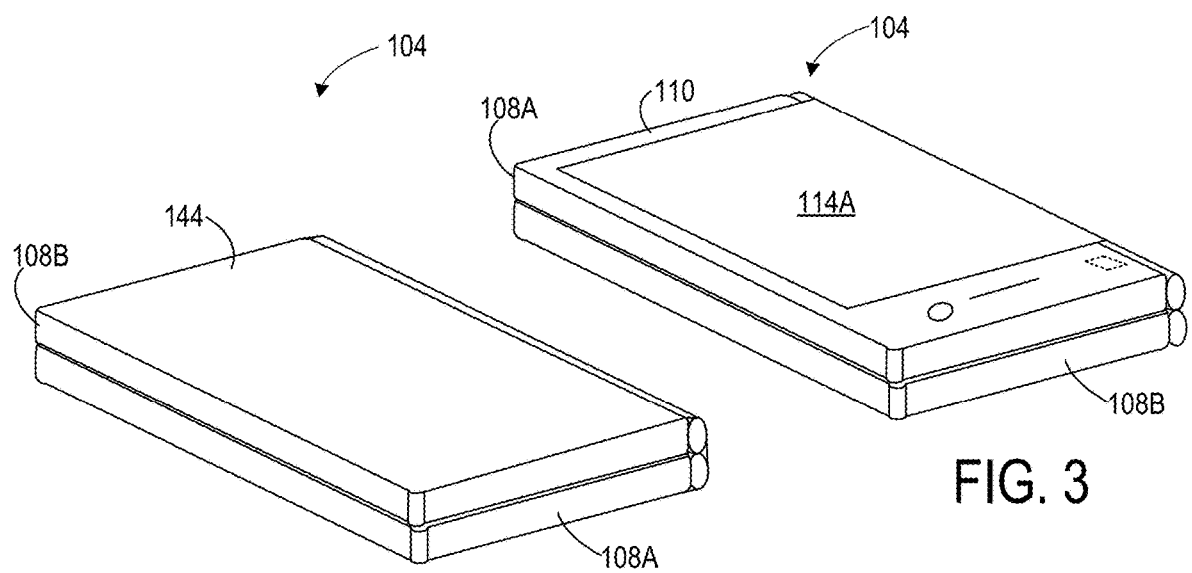
FIG. 4
FIG. 3
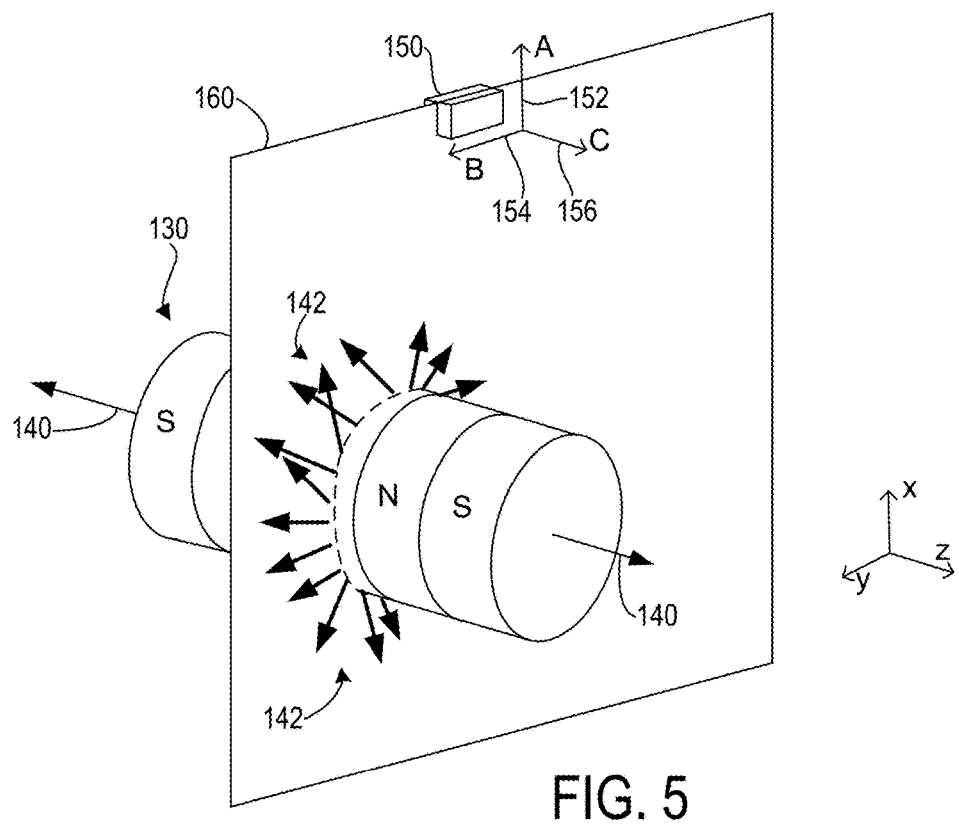
FIG. 5

ROTATABLY COUPLED TOUCH SCREEN DISPLAYS

BACKGROUND

Some computing devices include substrates that are rotatably coupled to enable folding of the device and positioning of the substrates at different relative angles. For example, in a dual screen smartphone or laptop, two touch screen displays may be rotatably coupled at a hinge such that the two displays are movable with respect to one another.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to computing devices and methods for determining angular orientations of a first planar substrate relative to a second planar substrate of a computing device throughout a range of degrees. In one example, the first planar substrate comprises a magnet array comprising a first magnet co-axially aligned with a second magnet along an array axis that passes through North and South poles of the first magnet and the second magnet. Like poles of the first magnet and the second magnet face one another to generate a magnetic field within an array plane that is normal to the array axis. The second planar substrate is rotatably coupled to the first planar substrate at a rotation axis, with the second planar substrate comprising a three-axis magnetic sensor configured to sense magnetic flux along three sensing axes.

The method includes receiving at the sensor the magnetic field emanating from the magnet array throughout the range of degrees; determining a plurality of magnetic flux densities of the magnetic flux at a first sensing axis and a second sensing axis of the sensor throughout the range of degrees; and using the magnetic flux densities to determine multiple angular orientations of the first planar substrate relative to the second planar substrate throughout the range of degrees.

BRIEF DESCRIPTION OF THE DRAWINGS

FIG. 3 shows the computing device of FIG. 1 folded into a back-to-back orientation according to examples of the present disclosure.

FIG. 4 shows the computing device of FIG. 1 folded into a display-to-display orientation according to examples of the present disclosure.

FIG. 5 schematically shows the magnet array of the computing device of FIG. 1 generating a magnetic field within an array plane, and the three-axis magnetic sensor oriented such that two sensing axes are coplanar with the array plane according to examples of the present disclosure.

DETAILED DESCRIPTION

Figure 1:
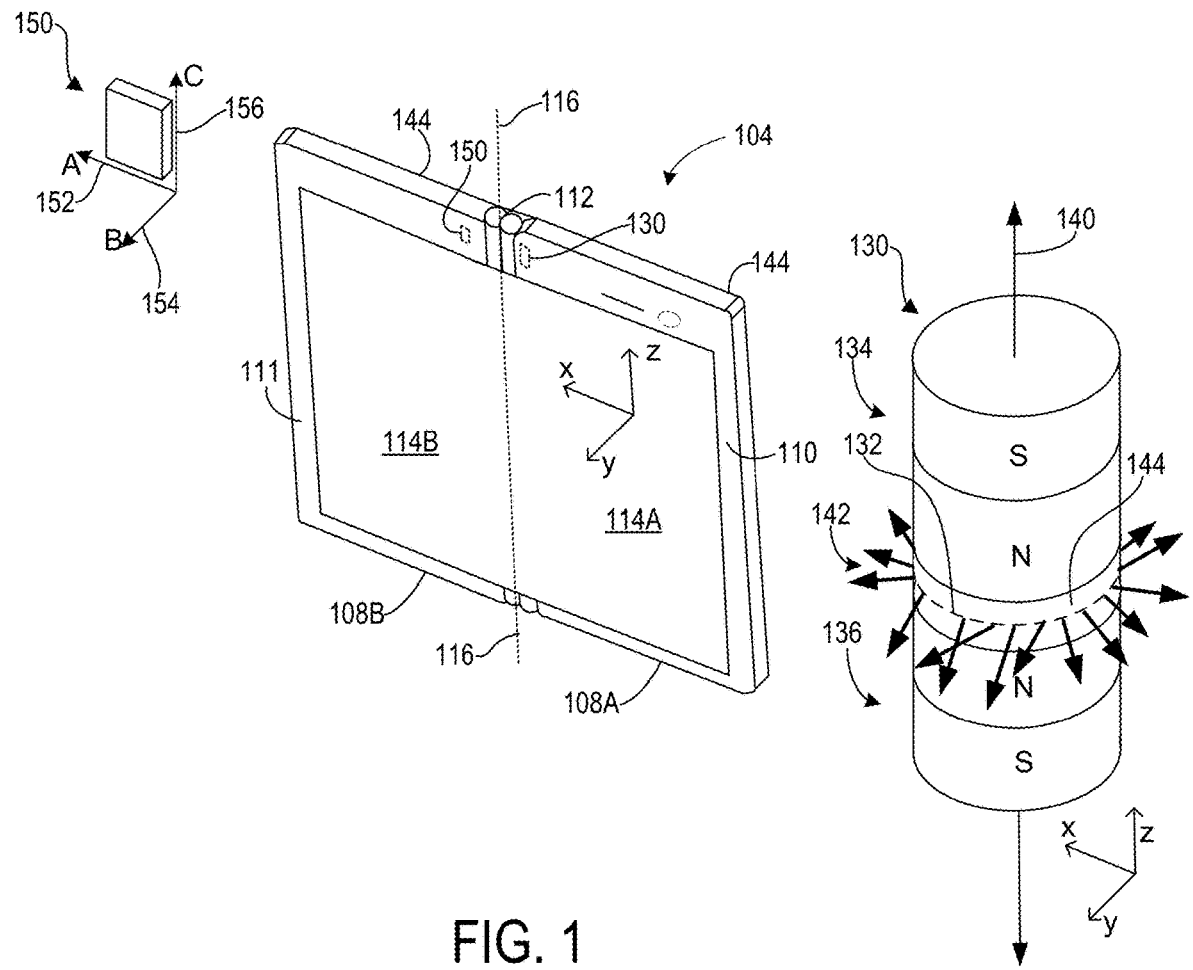
FIG. 1 shows one example of a computing device with a magnet array and three-axis magnetic sensor according to examples of the present disclosure.

Some computing devices include two substrates, such as displays, that are rotatably coupled to enable positioning of the two substrates at different angles relative to one another. For example, in a dual screen smartphone or laptop, two touch screen displays may be rotatably coupled at a hinge such that the two displays are movable with respect to one another. In some examples, both touch screen displays can function together as a larger, combined touch screen display system. In some examples, the two displays are rotatable approximately 360 degrees between angular orientations from a closed, display-to-display orientation to an open, back-to-back orientation.

In these devices it can be desirable to estimate the relative angle between the substrates at different orientations of the substrates. In some examples, multiple sensors are utilized to estimate such relative angle. For example, in some devices each substrate includes a 6-axis inertial measurement unit (IMU) to estimate the relative angle by comparing the relative estimated poses of each substrate.

These configurations, however, have certain drawbacks. For example, when the hinge axis of the device is aligned with gravity, the IMU accelerometer ceases to function effectively and gyroscope error accumulates unchecked. This causes error in the estimated hinge angle to also accumulate over time. Additionally, the performance and accuracy of these configurations degrades in high-vibration scenarios, such as when using the device in a car for navigation.

In some examples a single-axis Hall sensor and magnet are used to determine when the device is in one of three states: face-to-face, back-to-back, or somewhere in between face-to-face and back-to-back. These configurations, however, are limited to determining only these three states and cannot determine, for example, angular orientations in between the back-to-back and face-to-face state. Additionally, in these examples the magnet and sensor must be sufficiently spaced apart such that the magnetic flux from the magnet at the sensor is minimal or zero when the device is open. In these examples the magnet is often placed near the center of one substrate and away from the axis of rotation. In these configurations, such positioning of the magnet can create packaging issues with other components also located near the center of the substrate, such as printed circuit boards and batteries.

Accordingly, examples are disclosed that relate to computing devices and methods for determining a plurality of angular orientations of a first planar substrate relative to a second planar substrate of a computing device throughout a range of degrees. In one example and as described in more detail below, a computing device foldable through a range of degrees at a rotation axis includes a first planar substrate comprising a magnet array. The magnet array includes a first magnet co-axially aligned with a second magnet along an array axis that passes through North and South poles of the first magnet and the second magnet. Like poles of the first and second magnets face one another to generate a magnetic field within an array plane normal to the array axis.

A second planar substrate is rotatably coupled to the first planar substrate at the rotation axis and includes a three-axis magnetic sensor configured to sense magnetic flux along three sensing axes. The three-axis magnetic sensor is oriented in the second planar substrate, and the magnet array is oriented in the first planar substrate, such that at multiple angular orientations of the two substrates throughout the range of degrees (1) a first sensing axis and a second sensing axis of the sensor are co-planar with the magnetic field in the array plane, and (2) the sensor receives magnetic flux from the magnetic field along the first sensing axis and the second sensing axis of the sensor.

The computing device includes a processor and a memory storing instructions executable by the processor to use the magnetic flux at the sensor to determine a plurality of angular orientations of the first planar substrate relative to the second planar substrate throughout the range of degrees.

With reference now to FIGS. 1-4, one example of a computing device is illustrated in the form of a dual screen mobile computing device 104. In other examples, the computing device may take the form of a laptop computing device, tablet computing device, or any other suitable computing device. In the example of FIGS. 1-4, the mobile computing device 104 includes a housing having a first planar substrate 108A and a second planar substrate 108B rotatably coupled by a hinge 112. The first planar substrate 108A includes a first surface 110 comprising first touch screen display 114A and the second planar substrate 108B includes a second surface 111 comprising a second touch screen display 114B.

In the example of FIGS. 1-4, the first touch screen display 114A and the second touch screen display 114B are rotatable about a rotation axis 116 relative to each other. In some examples, hinge 112 includes one or more additional rotation axes about which the first touch screen display 114A and the second touch screen display 114B are rotatable relative to one another. In the present example, the hinge 112 is configured to permit the first touch screen display 114A and the second touch screen display 114B to rotate through 360 degrees between angular orientations from a display-to-display orientation (FIG. 4) to a back-to-back orientation (FIG. 3). In other examples, the first touch screen display 114A and the second touch screen display 114B are rotatable through a range of degrees less than 360 degrees.

The computing device 104 includes a rear cover 144 that extends over the hinge 112. In the example of FIGS. 1-4, the rear cover 144 is a single-piece rear cover that comprises a stretchable material at least in an expandable area located adjacent to the hinge 112. In this manner, the rear cover may expand and contract as the display device is rotated through different angles and orientations. In other examples, computing devices according to the present disclosure include a left rear cover and a separate right rear cover that are rotatably coupled via the hinge 112.

Figure 2:
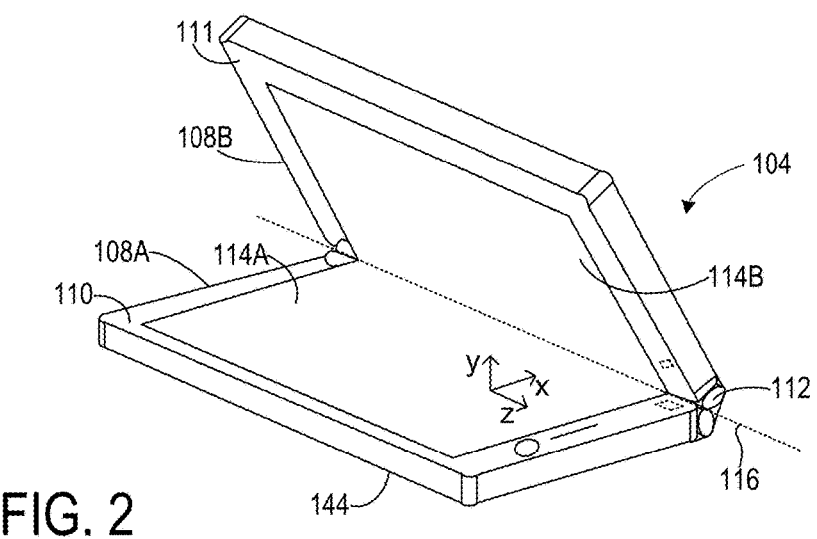
FIG. 2 shows the computing device of FIG. 1 folded about a rotation axis according to examples of the present disclosure.

With reference now to FIG. 2, the hinge 112 permits the first touch screen display 114A and the second touch screen display 114B to rotate relative to one another such that an angle between the displays 114A, 114B can be decreased or increased by the user via applying suitable force to the first planar substrate 108A and/or second planar substrate 108B. From the angular orientation shown in FIG. 2, the first touch screen display 114A and the second touch screen display 114B may be rotated until the displays 114A, 114B reach a back-to-back angular orientation as shown in FIG. 3 or a display-to-display angular orientation as shown in FIG. 4. For purposes of the present disclosure and for descriptive purposes only, the display-to-display orientation of FIG. 4 corresponds to an angular orientation of the first planar substrate 108A relative to the second planar substrate 108B of approximately zero degrees, and the back-to-back orientation of FIG. 3 corresponds to an angular orientation of the first planar substrate 108A relative to the second planar substrate 108B of approximately 360 degrees. In other examples, the back-to-back orientation of FIG. 3 corresponds to an angular orientation of approximately zero degrees and the display-to-display orientation of FIG. 4 corresponds to an angular orientation of approximately 360 degrees.

With reference again to FIG. 1 and as described in more detail below, the first planar substrate 108A comprises a magnet array 130 and the second planar substrate 108B comprises a three-axis magnetic sensor 150 that are oriented in a particular manner that enables the three-axis magnetic sensor to determine a plurality of angular orientations of the first planar substrate relative to the second planar substrate throughout a range of degrees. In the present example, the three-axis magnetic sensor 150 comprises a three-axis Hall sensor. In other examples, other suitable three-axis magnetic sensors may be utilized. For ease of description FIG. 1 also shows enlarged representations of the magnet array 130 and the three-axis magnetic sensor 150.

In the example of FIG. 1, a three-dimensional cartesian coordinate system (x-y-z) is defined with respect to the first planar substrate 108A and includes a z-axis that is parallel to the rotation axis 116 of computing device 104. As described in more detail below, the magnet array 130 and three-axis magnetic sensor 150 are arranged relative to one another such that the magnetic field generated by the magnet array is always in-plane with two of the sensor's three axes through the full range of rotation of the two substrates. In this manner, the magnetic field lines are always pointing towards a centerline 132 of the magnet array 130, and the field incident on the three-axis magnetic sensor 150 will describe a vector in those 2 sensor axes that always points towards the magnet. Advantageously and as explained below, this configuration allows the computing device 104 to estimate the angle of the three-axis magnetic sensor 150 relative to the magnet array 130 at any angular orientation of the first planar substrate relative to the second planar substrate throughout the range of degrees between zero and 360 degrees, and thereby determine such angular orientation of the first planar substrate 108A relative to the second planar substrate 108B.

In the present example, the magnet array 130 comprises a first magnet 134 that is co-axially aligned with a second magnet 136 along an array axis 140 that passes through North and South poles of the first magnet and the second magnet. In this example, the North poles of the first magnet 134 and the second magnet 136 face one another. In this manner and with reference also to FIG. 5, the magnet array 130 generates a magnetic field 142 within an array plane 160 in the x-y axes that is normal to the array axis 140 extending in the z-axis direction.

Figure 6:
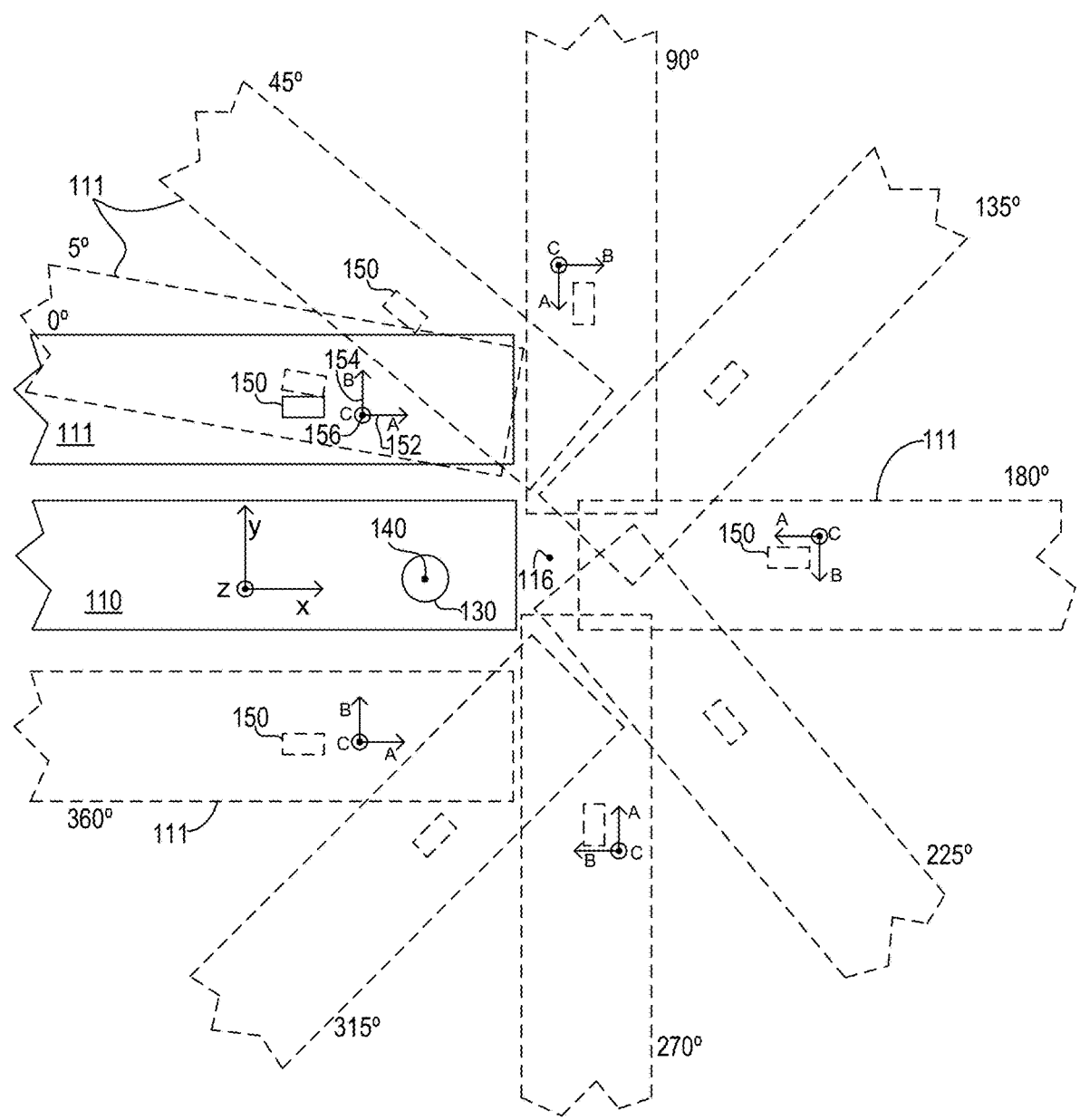
FIG. 6 schematically shows the computing device of FIG. 1 in multiple angular orientations of the first planar substrate relative to the second planar substrate according to examples of the present disclosure.

Additionally and in this example, the magnet array 130 is positioned such that array axis 140 is parallel to the rotation axis 116 at all angular orientations of the first planar substrate 108A relative to the second planar substrate 108B. With reference now to FIG. 6 showing a schematic illustration of the second planar substrate 108B and three-axis magnetic sensor 150 rotating relative to the first planar substrate 108A, it can be seen that the array axis 140 extending in the z-axis direction remains parallel to the rotation axis 116 (also extending in the z-axis direction) at all angular orientations of the first planar substrate 108A relative to the second planar substrate 108B, from zero to 360 degrees. In some examples and with some hinge configurations, the rotation axis 116 can move in the x-direction and/or y-direction as the first planar substrate 108A and second planar substrate 108B rotate relative to one another.

With reference again to FIG. 1, in this example the magnet array 130 includes a layer of intermediate material 144 interposed between the first magnet 134 and second magnet 136. In different examples, the intermediate material 144 can comprise steel or other suitable high permeability material. The intermediate material 144 can function to guide the magnetic field 142 to emanate normal to the array axis 140, and/or can provide structural support to the magnet array 130. In other examples an intermediate material may not be utilized, and the North poles of first magnet 134 and second magnet 136 may abut one another. In some examples, magnet array 130 is configured such that the South poles of the first magnet 134 and the second magnet 136 face one another.

In the present example magnet array 130 is cylindrical in shape. In other examples, magnet arrays can take a variety of other shapes and/or cross sections, such as rectangular, hexagonal, oblong, and wedge-shaped with a tapering thickness. In some examples, magnet arrays can include one or more additional magnets to generate a magnetic field within an array plane that is normal to the array axis.

With continued reference to FIG. 1, the three-axis magnetic sensor 150 comprises three orthogonal sensing axes—a first (A) sensing axis 152, second (B) sensing axis 154, and third (C) sensing axis 156. In some examples, the three-axis magnetic sensor 150 comprises magnetic sensors, signal amplifier(s), and interface logic for independently detecting magnetic flux in each of the first (A) sensing axis 152, second (B) sensing axis 154, and third (C) sensing axis 156.

As noted above, the magnet array 130 and the three-axis magnetic sensor 150 are oriented in first planar substrate 108A and second planar substrate 108B, respectively, in a manner that enables the computing device 104 to determine multiple angular orientations of the first planar substrate 108A relative to the second planar substrate 108B throughout a range of degrees. More particularly and with reference also to FIG. 5, the sensor 150 is positioned within the second planar substrate 108B such that its first (A) sensing axis 152 and second (B) sensing axis 154 are coplanar with the array plane 160 and magnetic field 142 emanating from the magnet array 130. Further and with reference also to FIG. 6, this coplanar relationship is maintained throughout the full range of angular orientations, which in this example is between approximately zero degrees and approximately 360 degrees. Accordingly and in one potential advantage of the present disclosure, this configuration enables the three-axis magnetic sensor 150 to receive the magnetic field 142 along its first (A) sensing axis 152 and its second (B) sensing axis 154 throughout the full range of angular orientations.

Further and in another advantage of the present disclosure, with this configuration the combined readings from the sensor's first (A) sensing axis 152 and second (B) sensing axis 154 are unique for each angle across the range of angular orientations. For example and with reference now to FIG. 7, one example of a plot 190 of magnetic flux density measurements at the sensor's first (A) sensing axis 152 ("A-Dir") and second (B) sensing axis 154 ("B-Dir") through the range of angular orientations from zero to 360 degrees is presented. As shown in this plot by line 180 representing magnetic flux densities along the first sensing axis 152 ("A-Dir") at the sensor, through the range of degrees and angular orientations between the first planar substrate 108A and the second planar substrate 108B, the magnetic flux densities along this first sensing axis remain positive. More particularly and as illustrated, in this example the magnetic flux densities at the sensor's first (A) sensing axis 152 trace a U-shaped curve from zero degrees to 360 degrees, with the minimum flux density value occurring at 180 degrees when the distance between the three-axis magnetic sensor 150 and magnet array 130 is greatest.

Figure 7:
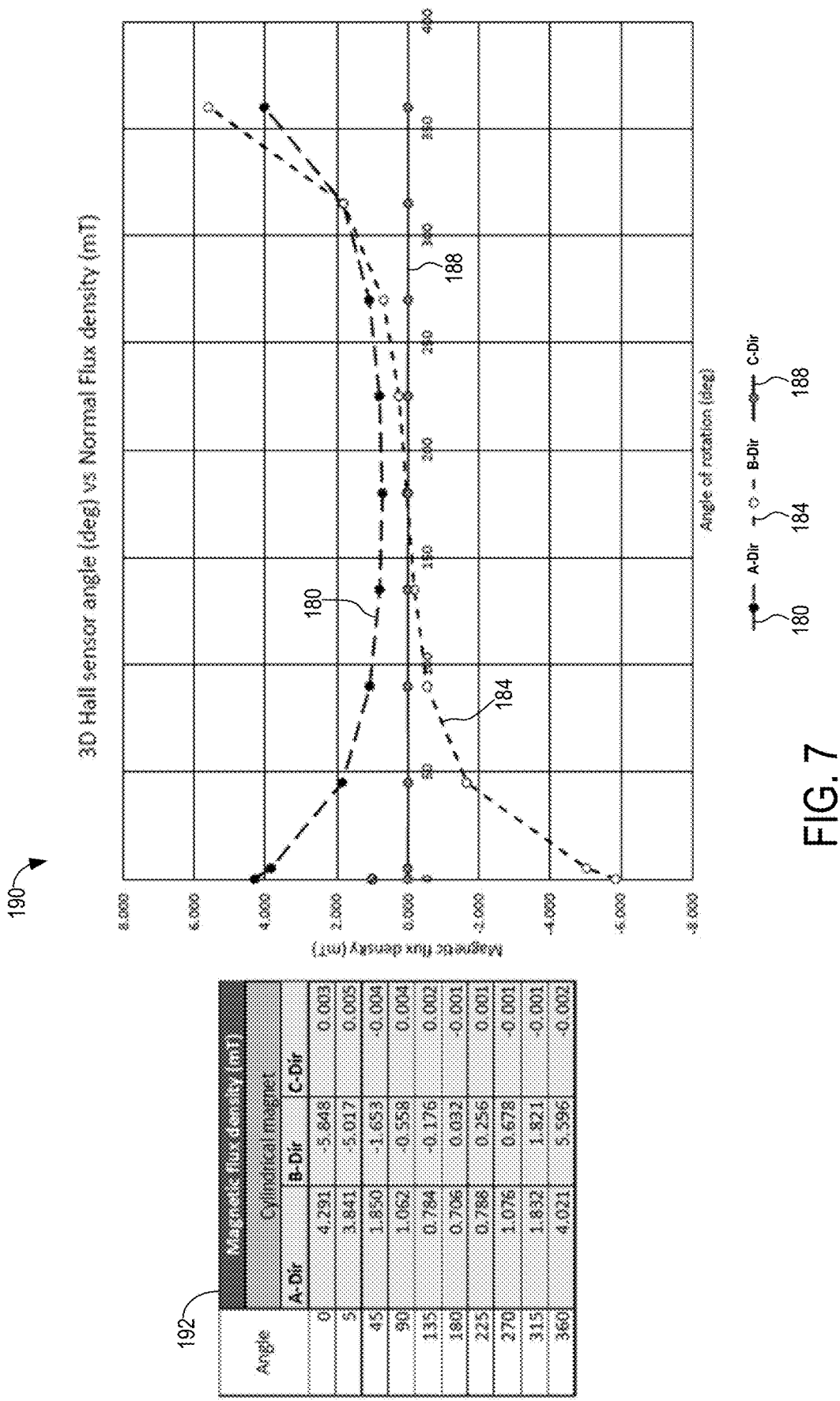
FIG. 7 shows a plot of magnetic flux density measurements at the sensor's first (A) sensing axis ("A-Dir"), second (B) sensing axis ("B-Dir"), and third (C) sensing axis ("C-Dir") through a range of angular orientations from zero to 360 degrees according to examples of the present disclosure.

By contrast, and by virtue of the relative orientation of the three-axis magnetic sensor 150 to the magnet array 130 in this configuration, through the range of degrees and angular orientations between the first planar substrate 108A and the second planar substrate 108B, the magnetic flux densities along the second sensing axis 154 ("B-Dir") at the sensor transition from negative to positive or positive to negative (depending upon the direction of rotation). In FIG. 7 this is illustrated by line 184 representing magnetic flux densities along the second sensing axis 154 ("B-Dir") at the sensor. More particularly, the magnetic flux densities at the second (B) sensing axis 154 trace an inverted S-shaped curve from a maximum negative value at zero degrees to a maximum positive value at 360 degrees. Additionally and as illustrated, the magnetic flux densities at this second (B) sensing axis 154 transition between negative and positive at 180 degrees angular orientation between the first planar substrate and the second planar substrate.

Advantageously, because this configuration provides unique readings from the sensor's first (A) sensing axis 152 and second (B) sensing axis 154 for each angle across the full range of angular orientations, a simple pose estimation algorithm can utilize the magnetic flux at the sensor to determine a plurality of angular orientations of the first planar substrate relative to the second planar substrate throughout the range of degrees. In some examples, a look up table containing magnetic flux densities at the first (A) sensing axis 152 ("A-Dir") and second (B) sensing axis 154 ("B-Dir") at a plurality of angular orientations is precomputed and stored in memory of the computing device 104. Such a look up table can be easily and quickly referenced by the pose estimation algorithm to select a closest angle for given A-Dir and B-Dir magnetic flux density values.

FIG. 7 shows an example look up table 192 with values corresponding to the lines 180 for the first (A) sensing axis 152 ("A-Dir") and 184 for the second (B) sensing axis 154 ("B-Dir"). In other examples, additional or fewer angles and corresponding magnetic flux densities can be included. In some examples, four or more angles and corresponding magnetic flux densities can be included in a look up table.

Additionally, as shown in the example of FIG. 7 and in another potential advantage of the present disclosure, with this particular orientation of the three-axis magnetic sensor 150 relative to the magnet array 130, the magnetic flux density from the magnet array at the third (C) sensing axis 156 ("C-Dir") is very small or negligible through the range of degrees and angular orientations between the first planar substrate 108A and the second planar substrate 108B. In other words, because the present configuration generates the magnetic field 142 in the array plane 160, and the first (A) sensing axis 152 and second (B) sensing axis 154 of the three-axis magnetic sensor 150 are coplanar with the array plane 160 and magnetic field 142 throughout the range of angular orientations, the magnetic flux density from the magnet array at the third (C) sensing axis 156 ("C-Dir") will be negligible or approximately zero. In FIG. 7 this is shown in look up table 192 and illustrated by corresponding line 188 representing magnetic flux densities along the third sensing axis ("C-Dir") at the sensor.

Accordingly, in use cases where the three-axis magnetic sensor 150 receives magnetic flux of a magnitude that falls outside an interference threshold range along the third (C) sensing axis 156 of the sensor, the computing device 104 determines that this magnetic flux is interference from a source other than the magnet array 130. In different examples, the interference threshold range is between −1.0 mT and 1.0 mT, −0.5 and 0.5 mT, and −0.1 and 0.1 mT. In other examples any other suitable range can be utilized. Advantageously, given that magnetic interference from extraneous sources could affect the accuracy and integrity of the readings generated by the three-axis magnetic sensor 150, the computing device 104 can utilize this determination to adjust pose estimation algorithms accordingly and/or utilize other sensors/functionality to determine the angular orientation of the first planar substrate relative to the second planar substrate.

Additionally, and in another potential advantage of the present disclosure illustrated in FIG. 7, the present configuration generates the greatest rates of change of magnetic flux density across the range of degrees at the extreme ends of the angle range. In this manner, the three-axis magnetic sensor 150 provides the highest fidelity magnetic flux readings at these extremes. Advantageously, such increased fidelity can be utilized to more accurately determine particular angles and angle changes in these extreme regions when the computing device is being opened from or closed into the display-to-display orientation and when the device is being opened from or closed into the back-to-back orientation. In this manner, the computing device 104 can initiate or trigger particular functions or user experiences at distinct angles within these extreme regions. In one example, upon determining that the relative orientation of the first planar substrate 108A to the second planar substrate 108B is 5 degrees, the computing device 104 initiates a "peek mode" user experience in which the time, date and notifications are displayed on both screens.

In one example, the range of degrees through which a computing device of the present disclosure is foldable is between a minimum degree (such as zero) and a maximum degrees (such as 360). An opening range is between zero degrees and approximately 10 degrees, a closing range is between approximately 350 degrees and 360 degrees, and a middle range is between approximately 10 degrees and approximately 360 degrees. In this example, and as illustrated in FIG. 7, both (1) a first set of rates of change of magnetic flux density at the first (A) sensing axis 152 and the second (B) sensing axis 154 in the opening range, and (2) a second set of rates of change of magnetic flux density at the first (A) sensing axis 152 and the second (B) sensing axis 154 in the closing range, are both greater than a third set of rates of change of magnetic flux density at the first (A) sensing axis 152 and the second (B) sensing axis 154 in the middle range. In other examples, other opening, middle, and closing ranges may be utilized.

In other potential advantages of the present disclosure, the present configurations can eliminate the need for one or more other sensors. For example, in a computing device that utilizes two IMU's to perform pose estimations for first and second rotatable substrates, the present configuration of magnet array 130 and three-axis magnetic sensor 150 can be utilized in place of one or both IMU's to perform pose estimation. Similarly and in other examples, the present configuration of magnet array 130 and three-axis magnetic sensor 150 can be utilized in place of one or more gyroscopes and/or one or more magnetometers that otherwise would be needed to estimate device pose. Further and in another advantage, the present configuration utilizes less power than a corresponding IMU, gyroscope or accelerometer, thereby conserving power resources.

In some examples and in another potential advantage of the present disclosure, and as illustrated in FIGS. 1-3, the magnet array 130 and three-axis magnetic sensor 150 can be located adjacent to the rotation axis 116, as opposed to near the centers of first touch screen display 114A and second touch screen display 114B, respectively, as required by other configurations. In different examples, the magnet array 130 and three-axis magnetic sensor 150 are located adjacent to the rotation axis 116 by being located within 20 cm of the rotation axis, within 10 cm of the rotation axis, and within 5 cm of the rotation axis. Advantageously, in these examples locating the magnet array 130 and three-axis magnetic sensor 150 adjacent to the rotation axis 112 saves valuable packaging space elsewhere in the computing device that can be utilized for processor(s), batteries and other components. Additionally, locating both the magnet array 130 and three-axis magnetic sensor 150 close to the rotation axis 116 increases the incidence of the magnetic field 152 on the sensor to provide increased accuracy and more precise measurements of the angular orientations of the first planar substrate 108A relative to the second planar substrate 108B.

While the example computing device 104 in FIG. 1 shows the magnet array 130 and three-axis magnetic sensor 150 located near the top of the device, in other examples the magnet array and sensor can be located at other positions along the z-axis, including near the bottom of the device, with the sensor's first (A) sensing axis 152 and second (B) sensing axis 154 remaining coplanar with the array plane 160 and magnetic field 142 emanating from the magnet array 130. In other examples, the three-axis magnetic sensor 150 is located further away from the rotation axis 116 such that it is not adjacent to the rotation axis, while its first (A) sensing axis 152 and second (B) sensing axis 154 remain coplanar with the array plane 160 and magnetic field 142 emanating from the magnet array 130.

Figure 8A:
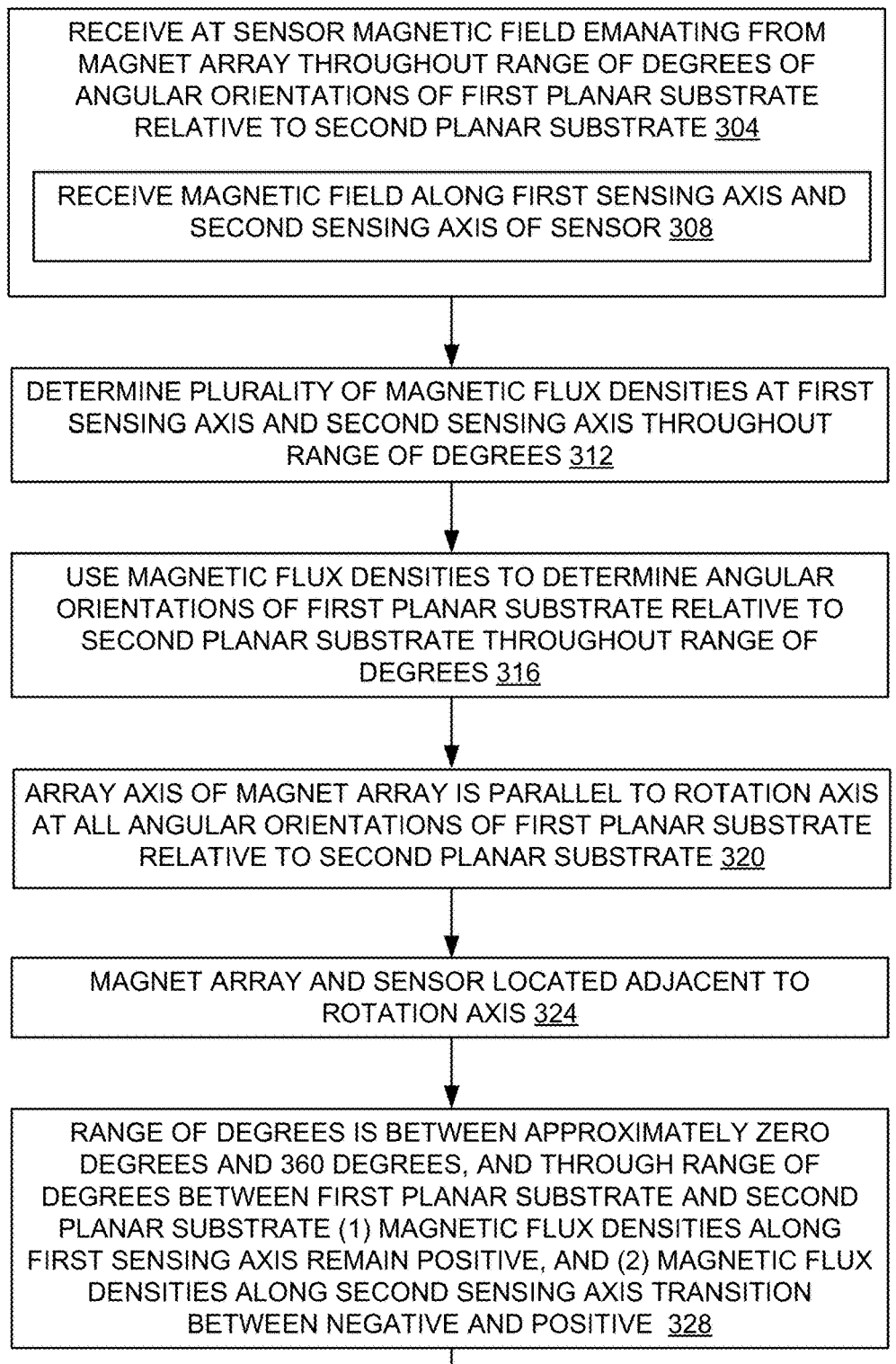
FIGS. 8A and 8B show a flow diagram of an example method for determining a plurality of angular orientations of a first planar substrate relative to a second planar substrate of a computing device according to examples of the present disclosure.
Figure 8B:
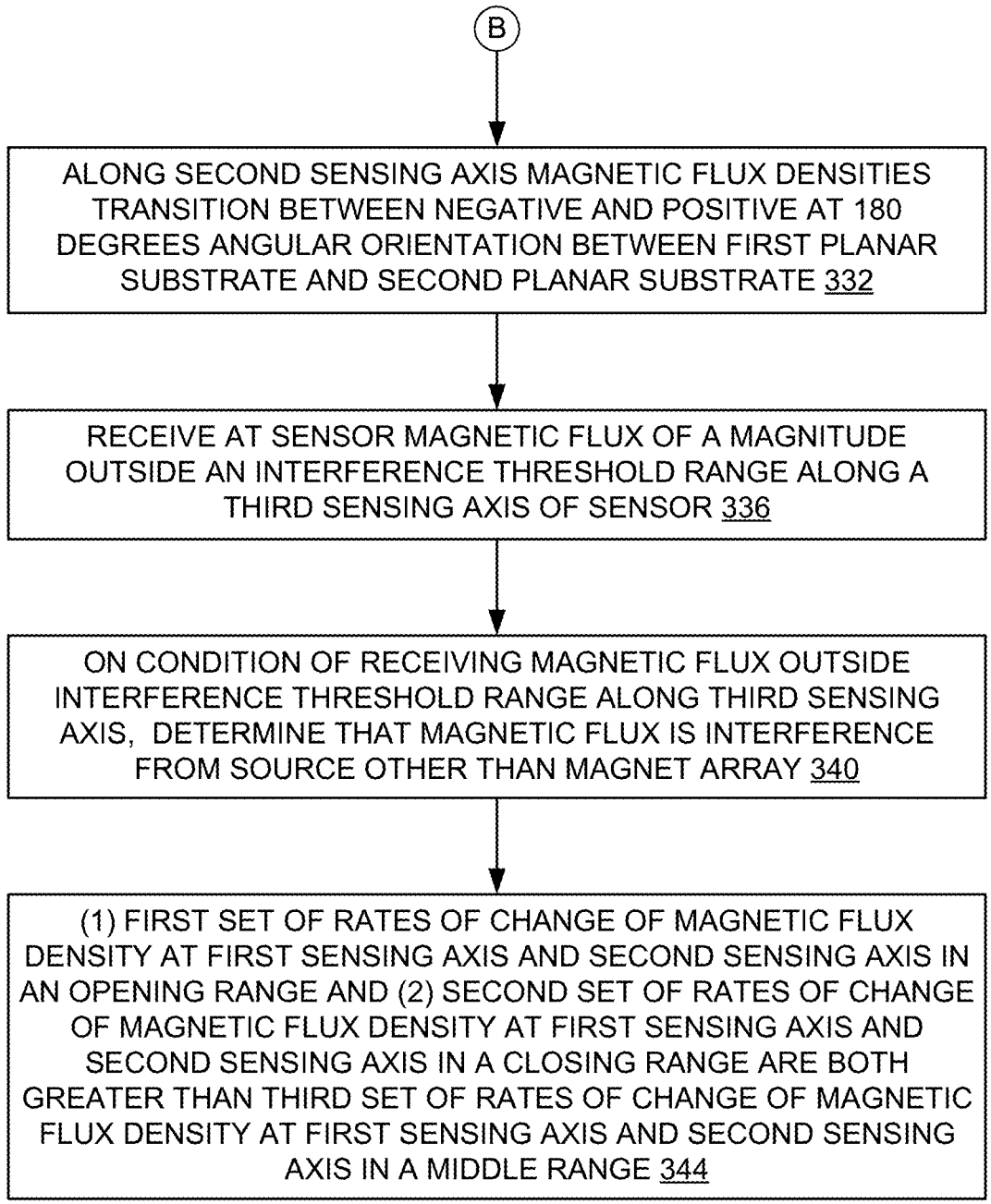

With reference now to FIGS. 8A-8B, a flow diagram is illustrated depicting an example method 300 for determining a plurality of angular orientations of a first planar substrate relative to a second planar substrate of a computing device throughout a range of degrees. The second planar substrate is rotatably coupled to the first planar substrate at a rotation axis. The first planar substrate comprises a magnet array comprising a first magnet co-axially aligned with a second magnet along an array axis that passes through North and South poles of the first magnet and the second magnet. Like poles of the first magnet and the second magnet face one another to generate a magnetic field within an array plane normal to the array axis. The second planar substrate comprises a three-axis magnetic sensor configured to sense magnetic flux along three sensing axes.

The following description of method 300 is provided with reference to the software and hardware components described herein and shown in FIGS. 1-7 and 9. For example, the method 300 may be performed by the computing device 104, hardware, software, and/or firmware of the computing device 104, three-axis magnetic sensor 150, or a suitable combination of components described herein.

It will be appreciated that following description of method 300 is provided by way of example and is not meant to be limiting. Therefore, it is to be understood that method 300 may include additional and/or alternative steps relative to those illustrated in FIGS. 8A and 8B. Further, it is to be understood that the steps of method 300 may be performed in any suitable order. Further still, it is to be understood that one or more steps may be omitted from method 300 without departing from the scope of this disclosure. It will also be appreciated that method 300 also may be performed in other contexts using other suitable components.

With reference to FIG. 8A, at 304 the method 300 includes receiving at the three-axis magnetic sensor the magnetic field emanating from the magnet array throughout the range of degrees. At 308 the method 300 includes receiving at the sensor the magnetic field along the first sensing axis and the second sensing axis of the three sensing axes of the sensor. At 312 the method 300 includes determining a plurality of magnetic flux densities of the magnetic flux at a first sensing axis and a second sensing axis of the sensor throughout the range of degrees. At 316 the method 300 includes using the magnetic flux densities sensed at the first sensing axis and the second sensing axis to determine multiple angular orientations of the first planar substrate relative to the second planar substrate throughout the range of degrees.

At 320 the method 300 includes, wherein the array axis of the magnet array is parallel to the rotation axis at all angular orientations of the first planar substrate relative to the second planar substrate. At 324 the method 300 incudes, wherein the magnet array and the sensor are located adjacent to the rotation axis. At 328 the method 300 includes, wherein the range of degrees is between approximately zero degrees and approximately 360 degrees, and through the range of degrees between the first planar substrate and the second planar substrate (1) magnetic flux densities along the first sensing axis at the sensor remain positive, and (2) magnetic flux densities along the second sensing axis at the sensor transition between negative and positive.

With reference now to FIG. 8B, at 332 the method 300 includes, wherein along the second sensing axis the magnetic flux densities transition between negative and positive at 180 degrees angular orientation between the first planar substrate and the second planar substrate. At 336 the method 300 includes receiving at the sensor magnetic flux of a magnitude outside an interference threshold range along a third sensing axis of the sensor. At 340 the method 300 includes, on condition of receiving the magnetic flux of the magnitude outside the interference threshold range along the third sensing axis of the sensor, determining that the magnetic flux is interference from a source other than the magnet array. At 344 the method 300 includes, wherein the range of degrees is between a minimum degree and a maximum degrees, an opening range is between the minimum degree and approximately 10 degrees, a closing range is between approximately 10 degrees less than the maximum degrees and the maximum degrees, and a middle range is between approximately 10 degrees and 10 degrees less than the maximum degrees, and wherein (1) a first set of rates of change of magnetic flux density at the first sensing axis and the second sensing axis of the sensor in the opening range and (2) a second set of rates of change of magnetic flux density at the first sensing axis and the second sensing axis of the sensor in the closing range are both greater than a third set of rates of change of magnetic flux density at the first sensing axis and the second sensing axis of the sensor in the middle range.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
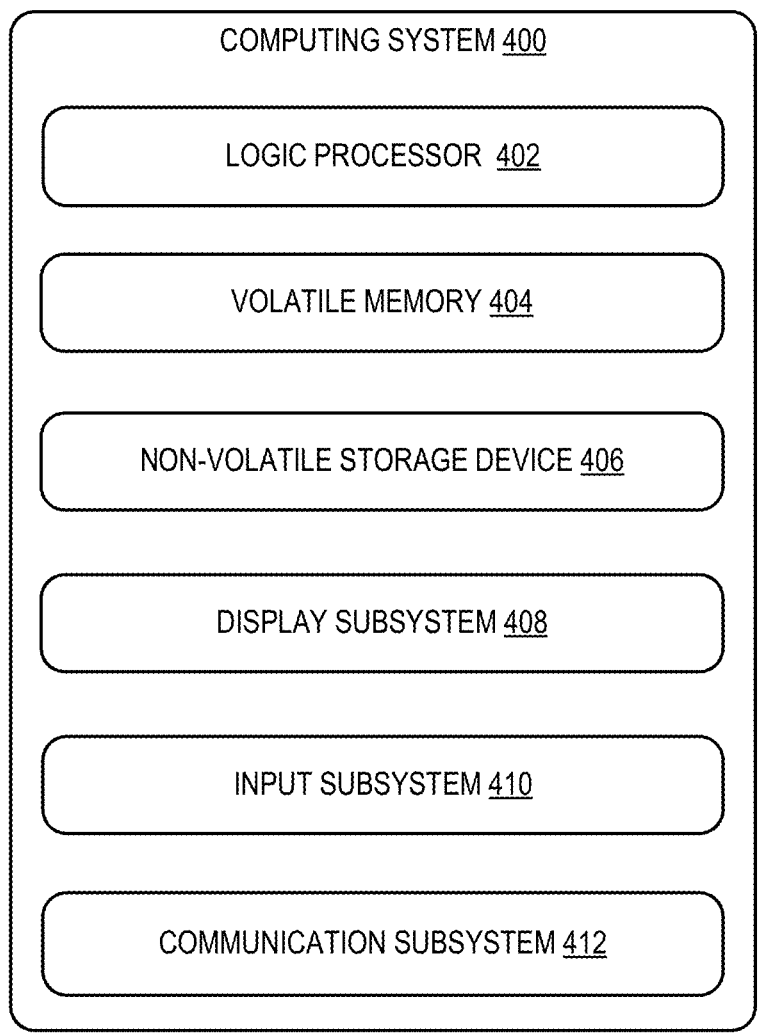
FIG. 9 shows a block diagram of an example computing system according to examples of the present disclosure

FIG. 9 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, gaming devices, mobile computing devices, mobile communication devices (e.g., smart phone), wearable computing devices, and/or other computing devices. The computing device 104 and three-axis magnetic sensor 150 described above and illustrated in FIGS. 1-4 may comprise computing system 400 or one or more aspects of computing system 400.

Computing system 400 includes a logic processor 402, volatile memory 404, and a non-volatile storage device 406. Computing system 400 may optionally include a display subsystem 408, input subsystem 410, communication subsystem 412, and/or other components not shown in FIG. 9.

Logic processor 402 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 404 may include physical devices that include random access memory (RAM). Volatile memory 404 is typically utilized by logic processor 402 to temporarily store information during processing of software instructions. It will be appreciated that volatile memory 404 typically does not continue to store instructions when power is cut to the volatile memory 404.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides a computing device foldable through a range of degrees at a rotation axis, the computing device comprising: a first planar substrate; a magnet array in the first planar substrate, the magnet array comprising a first magnet co-axially aligned with a second magnet along an array axis that passes through North and South poles of the first magnet and the second magnet, wherein like poles of the first magnet and the second magnet face one another to generate a magnetic field within an array plane normal to the array axis; a second planar substrate rotatably coupled to the first planar substrate at the rotation axis; a three-axis magnetic sensor in the second planar substrate configured to sense magnetic flux along three sensing axes, wherein the three-axis magnetic sensor is oriented in the second planar substrate and the magnet array is oriented in the first planar substrate such that at multiple angular orientations of the first planar substrate relative to the second planar substrate throughout the range of degrees (1) a first sensing axis and a second sensing axis of the sensor are co-planar with the magnetic field in the array plane, and (2) the sensor receives magnetic flux from the magnetic field along the first sensing axis and the second sensing axis of the sensor; a processor; and a memory storing instructions executable by the processor to use the magnetic flux at the sensor to determine a plurality of angular orientations of the first planar substrate relative to the second planar substrate throughout the range of degrees. The computing device may additionally or alternatively include, wherein the array axis of the magnet array is parallel to the rotation axis at all angular orientations of the first planar substrate relative to the second planar substrate. The computing device may additionally or alternatively include, wherein the magnet array and the three-axis magnetic sensor are located adjacent to the rotation axis.

The computing device may additionally or alternatively include, wherein the three-axis magnetic sensor receives the magnetic field along the first sensing axis and the second sensing axis of the sensor throughout the range of degrees. The computing device may additionally or alternatively include, wherein the range of degrees is between approximately zero degrees and approximately 360 degrees, and through the range of degrees between the first planar substrate and the second planar substrate (1) magnetic flux densities along the first sensing axis at the sensor remain positive, and (2) magnetic flux densities along the second sensing axis at the sensor transition between negative and positive. The computing device may additionally or alternatively include, wherein along the second sensing axis the magnetic flux densities transition between negative and positive at 180 degrees angular orientation between the first planar substrate and the second planar substrate.

The computing device may additionally or alternatively include, wherein the sensor receives magnetic flux of a magnitude outside an interference threshold range along a third sensing axis of the sensor, and the instructions are executable by the processor to, on condition of receiving the magnetic flux of the magnitude outside the interference threshold range along the third sensing axis of the sensor, determine that the magnetic flux is interference from a source other than the magnet array. The computing device may additionally or alternatively include, wherein the range of degrees is between a minimum degree and a maximum degrees, an opening range is between the minimum degree and approximately 10 degrees, a closing range is between approximately 10 degrees less than the maximum degrees and the maximum degrees, and a middle range is between approximately 10 degrees and 10 degrees less than the maximum degrees, and wherein (1) a first set of rates of change of magnetic flux density at the first sensing axis and the second sensing axis of the sensor in the opening range and (2) a second set of rates of change of magnetic flux density at the first sensing axis and the second sensing axis of the sensor in the closing range are both greater than a third set of rates of change of magnetic flux density at the first sensing axis and the second sensing axis of the sensor in the middle range.

Another aspect provides a method for determining a plurality of angular orientations of a first planar substrate relative to a second planar substrate of a computing device throughout a range of degrees, wherein the first planar substrate comprises a magnet array comprising a first magnet co-axially aligned with a second magnet along an array axis that passes through North and South poles of the first magnet and the second magnet, wherein like poles of the first magnet and the second magnet face one another to generate a magnetic field within an array plane normal to the array axis, and the second planar substrate is rotatably coupled to the first planar substrate at a rotation axis, the second planar substrate comprising a three-axis magnetic sensor configured to sense magnetic flux along three sensing axes, the method comprising: receiving at the sensor the magnetic field emanating from the magnet array throughout the range of degrees; determining a plurality of magnetic flux densities of the magnetic flux at a first sensing axis and a second sensing axis of the sensor throughout the range of degrees; and using the magnetic flux densities sensed at the first sensing axis and the second sensing axis to determine multiple angular orientations of the first planar substrate relative to the second planar substrate throughout the range of degrees.

The method may additionally or alternatively include, wherein the array axis of the magnet array is parallel to the rotation axis at all angular orientations of the first planar substrate relative to the second planar substrate. The method may additionally or alternatively include, wherein the magnet array and the sensor are located adjacent to the rotation axis. The method may additionally or alternatively include receiving at the sensor the magnetic field along the first sensing axis and the second sensing axis of the three sensing axes of the sensor. The method may additionally or alternatively include, wherein the range of degrees is between approximately zero degrees and approximately 360 degrees, and through the range of degrees between the first planar substrate and the second planar substrate (1) magnetic flux densities along the first sensing axis at the sensor remain positive, and (2) magnetic flux densities along the second sensing axis at the sensor transition between negative and positive. The method may additionally or alternatively include, wherein along the second sensing axis the magnetic flux densities transition between negative and positive at 180 degrees angular orientation between the first planar substrate and the second planar substrate.

The method may additionally or alternatively include receiving at the sensor magnetic flux of a magnitude outside an interference threshold range along a third sensing axis of the sensor; and on condition of receiving the magnetic flux of the magnitude outside the interference threshold range along the third sensing axis of the sensor, determining that the magnetic flux is interference from a source other than the magnet array. The method may additionally or alternatively include, wherein the range of degrees is between a minimum degree and a maximum degrees, an opening range is between the minimum degree and approximately 10 degrees, a closing range is between approximately 10 degrees less than the maximum degrees and the maximum degrees, and a middle range is between approximately 10 degrees and 10 degrees less than the maximum degrees, and wherein (1) a first set of rates of change of magnetic flux density at the first sensing axis and the second sensing axis of the sensor in the opening range and (2) a second set of rates of change of magnetic flux density at the first sensing axis and the second sensing axis of the sensor in the closing range are both greater than a third set of rates of change of magnetic flux density at the first sensing axis and the second sensing axis of the sensor in the middle range.

Another aspect provides display device foldable at a rotation axis through a range of degrees between approximately zero degrees and approximately 360 degrees, the display device comprising: a first display; a magnet array in the first display, the magnet array comprising a first magnet co-axially aligned with a second magnet along an array axis that passes through North and South poles of the first magnet and the second magnet, wherein like poles of the first magnet and the second magnet face one another to generate a magnetic field within an array plane normal to the array axis; a second display rotatably coupled to the first display at the rotation axis, wherein the first display and the second display are rotatable through the range of degrees between approximately zero degrees and approximately 360 degrees; a three-axis magnetic sensor in the second display configured to sense magnetic flux along three sensing axes, wherein the three-axis magnetic sensor is oriented in the second display and the magnet array is oriented in the first display such that at multiple angular orientations of the first display relative to the second display throughout the range of degrees (1) a first sensing axis and a second sensing axis of the sensor are co-planar with the magnetic field in the array plane, and (2) the sensor receives magnetic flux from the magnetic field along the first sensing axis and the second sensing axis of the sensor; a processor; and a memory storing instructions executable by the processor to use the magnetic flux at the sensor to determine a plurality of angular orientations of the first display relative to the second display throughout the range of degrees. The display device may additionally or alternatively include, wherein through the range of degrees between the first planar substrate and the second planar substrate (1) magnetic flux densities along the first sensing axis at the sensor remain positive, and (2) magnetic flux densities along the second sensing axis at the sensor transition between negative and positive.

The display device may additionally or alternatively include, wherein along the second sensing axis the magnetic flux densities transition between negative and positive at 180 degrees angular orientation between the first planar substrate and the second planar substrate. The display device may additionally or alternatively include, wherein the sensor receives magnetic flux of a magnitude outside of an interference threshold range along a third sensing axis of the sensor, and the instructions are executable by the processor to, on condition of receiving the magnetic flux of the magnitude outside the interference threshold range along the third sensing axis of the sensor, determine that the magnetic flux is interference from a source other than the magnet array.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device foldable through a range of degrees at a rotation axis, the computing device comprising:
    a first planar substrate;
    a magnet array in the first planar substrate, the magnet array comprising a first magnet co-axially aligned with a second magnet along an array axis that passes through North and South poles of the first magnet and the second magnet, wherein like poles of the first magnet and the second magnet face one another to generate a magnetic field within an array plane normal to the array axis;
    a second planar substrate rotatably coupled to the first planar substrate at the rotation axis, wherein the array axis of the magnet array is parallel to the rotation axis at all angular orientations of the first planar substrate relative to the second planar substrate;
    a three-axis magnetic sensor in the second planar substrate configured to sense magnetic flux along three sensing axes, wherein the three-axis magnetic sensor is oriented in the second planar substrate and the magnet array is oriented in the first planar substrate such that at multiple angular orientations of the first planar substrate relative to the second planar substrate throughout the range of degrees (1) a first sensing axis and a second sensing axis of the three-axis magnetic sensor are co-planar with the magnetic field in the array plane, and (2) the three-axis magnetic sensor receives magnetic flux from the magnetic field along the first sensing axis and the second sensing axis of the three-axis magnetic sensor;
    a processor; and
    a memory storing instructions executable by the processor to use the magnetic flux at the three-axis magnetic sensor to determine a plurality of angular orientations of the first planar substrate relative to the second planar substrate throughout the range of degrees.

2. The computing device of claim 1, wherein the magnet array and the three-axis magnetic sensor are located adjacent to the rotation axis.

3. The computing device of claim 1, wherein the three-axis magnetic sensor receives the magnetic field along the first sensing axis and the second sensing axis of the three-axis magnetic sensor throughout the range of degrees.

4. The computing device of claim 1, wherein the range of degrees is between approximately zero degrees and approximately 360 degrees, and through the range of degrees between the first planar substrate and the second planar substrate (1) magnetic flux densities along the first sensing axis at the three-axis magnetic sensor remain positive, and (2) magnetic flux densities along the second sensing axis at the three-axis magnetic sensor transition between negative and positive.

5. The computing device of claim 4, wherein along the second sensing axis the magnetic flux densities transition between negative and positive at 180 degrees angular orientation between the first planar substrate and the second planar substrate.

6. The computing device of claim 1, wherein the three-axis magnetic sensor receives magnetic flux of a magnitude outside an interference threshold range along a third sensing axis of the three-axis magnetic sensor, and the instructions are executable by the processor to, on condition of receiving the magnetic flux of the magnitude outside the interference threshold range along the third sensing axis of the three-axis magnetic sensor, determine that the magnetic flux is interference from a source other than the magnet array.

7. The computing device of claim 1, wherein the range of degrees is between a minimum degree and a maximum degrees, an opening range is between the minimum degree and approximately 10 degrees, a closing range is between approximately 10 degrees less than the maximum degrees and the maximum degrees, and a middle range is between approximately 10 degrees and 10 degrees less than the maximum degrees, and wherein (1) a first set of rates of change of magnetic flux density at the first sensing axis and the second sensing axis of the three-axis magnetic sensor in the opening range and (2) a second set of rates of change of magnetic flux density at the first sensing axis and the second sensing axis of the three-axis magnetic sensor in the closing range are both greater than a third set of rates of change of magnetic flux density at the first sensing axis and the second sensing axis of the three-axis magnetic sensor in the middle range.

8. A method for determining a plurality of angular orientations of a first planar substrate relative to a second planar substrate of a computing device throughout a range of degrees, wherein the first planar substrate comprises a magnet array comprising a first magnet co-axially aligned with a second magnet along an array axis that passes through North and South poles of the first magnet and the second magnet, wherein like poles of the first magnet and the second magnet face one another to generate a magnetic field within an array plane normal to the array axis, and the second planar substrate is rotatably coupled to the first planar substrate at a rotation axis, the second planar substrate comprising a three-axis magnetic sensor configured to sense magnetic flux along three sensing axes, wherein the array axis of the magnet array is parallel to the rotation axis at all angular orientations of the first planar substrate relative to the second planar substrate, the method comprising:
    receiving at the three-axis magnetic sensor the magnetic field emanating from the magnet array throughout the range of degrees;
    determining a plurality of magnetic flux densities of the magnetic flux at a first sensing axis and a second sensing axis of the three-axis magnetic sensor throughout the range of degrees; and using the magnetic flux densities sensed at the first sensing axis and the second sensing axis to determine multiple angular orientations of the first planar substrate relative to the second planar substrate throughout the range of degrees.

9. The method of claim 8, wherein the array axis of the magnet array is parallel to the rotation axis at all angular orientations of the first planar substrate relative to the second planar substrate.

10. The method of claim 8, wherein the magnet array and the three-axis magnetic sensor are located adjacent to the rotation axis.

11. The method of claim 8, further comprising receiving at the three-axis magnetic sensor the magnetic field along the first sensing axis and the second sensing axis of the three sensing axes of the three-axis magnetic sensor.

12. The method of claim 8, wherein the range of degrees is between approximately zero degrees and approximately 360 degrees, and through the range of degrees between the first planar substrate and the second planar substrate (1) magnetic flux densities along the first sensing axis at the three-axis magnetic sensor remain positive, and (2) magnetic flux densities along the second sensing axis at the three-axis magnetic sensor transition between negative and positive.

13. The method of claim 12, wherein along the second sensing axis the magnetic flux densities transition between negative and positive at 180 degrees angular orientation between the first planar substrate and the second planar substrate.

14. The method of claim 8, further comprising:
receiving at the three-axis magnetic sensor magnetic flux of a magnitude outside an interference threshold range along a third sensing axis of the three-axis magnetic sensor; and
on condition of receiving the magnetic flux of the magnitude outside the interference threshold range along the third sensing axis of the three-axis magnetic sensor, determining that the magnetic flux is interference from a source other than the magnet array.

15. The method of claim 8, wherein the range of degrees is between a minimum degree and a maximum degrees, an opening range is between the minimum degree and approximately 10 degrees, a closing range is between approximately 10 degrees less than the maximum degrees and the maximum degrees, and a middle range is between approximately 10 degrees and 10 degrees less than the maximum degrees, and wherein (1) a first set of rates of change of magnetic flux density at the first sensing axis and the second sensing axis of the three-axis magnetic sensor in the opening range and (2) a second set of rates of change of magnetic flux density at the first sensing axis and the second sensing axis of the three-axis magnetic sensor in the closing range are both greater than a third set of rates of change of magnetic flux density at the first sensing axis and the second sensing axis of the three-axis magnetic sensor in the middle range.

16. A display device foldable at a rotation axis through a range of degrees between approximately zero degrees and approximately 360 degrees, the display device comprising:
a first display;
a magnet array in the first display, the magnet array comprising a first magnet co-axially aligned with a second magnet along an array axis that passes through North and South poles of the first magnet and the second magnet, wherein like poles of the first magnet and the second magnet face one another to generate a magnetic field within an array plane normal to the array axis;
a second display rotatably coupled to the first display at the rotation axis, wherein the first display and the second display are rotatable through the range of degrees between approximately zero degrees and approximately 360 degrees, wherein the array axis of the magnet array is parallel to the rotation axis at all angular orientations of the first display relative to the second display;
a three-axis magnetic sensor in the second display configured to sense magnetic flux along three sensing axes, wherein the three-axis magnetic sensor is oriented in the second display and the magnet array is oriented in the first display such that at multiple angular orientations of the first display relative to the second display throughout the range of degrees (1) a first sensing axis and a second sensing axis of the three-axis magnetic sensor are co-planar with the magnetic field in the array plane, and (2) the three-axis magnetic sensor receives magnetic flux from the magnetic field along the first sensing axis and the second sensing axis of the three-axis magnetic sensor;
a processor; and
a memory storing instructions executable by the processor to use the magnetic flux at the three-axis magnetic sensor to determine a plurality of angular orientations of the first display relative to the second display throughout the range of degrees.

17. The display device of claim 16, wherein through the range of degrees between the first display and the second display (1) magnetic flux densities along the first sensing axis at the three-axis magnetic sensor remain positive, and (2) magnetic flux densities along the second sensing axis at the three-axis magnetic sensor transition between negative and positive.

18. The display device of claim 17, wherein along the second sensing axis the magnetic flux densities transition between negative and positive at 180 degrees angular orientation between the first display and the second display.

19. The display device of claim 16, wherein the three-axis magnetic sensor receives magnetic flux of a magnitude outside an interference threshold range along a third sensing axis of the three-axis magnetic sensor, and the instructions are executable by the processor to, on condition of receiving the magnetic flux of the magnitude outside the interference threshold range along the third sensing axis of the three-axis magnetic sensor, determine that the magnetic flux is interference from a source other than the magnet array.

* * * * *